(12) United States Patent
Adema et al.

(10) Patent No.: US 9,651,236 B2
(45) Date of Patent: May 16, 2017

(54) LIGHT EMITTING DEVICE WITH A HEAT SINK COMPOSED OF TWO MATERIALS

(71) Applicant: CHRISTIE DIGITAL SYSTEMS USA, INC., Cypress, CA (US)

(72) Inventors: Daniel Robert Adema, Kitchener (CA); Graham Hill, Waterloo (CA); Simon Guthrie, Kitchener (CA); Darren Pastrik, Kitchener (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 461 days.

(21) Appl. No.: 14/169,914

(22) Filed: Jan. 31, 2014

(65) Prior Publication Data
US 2015/0219327 A1    Aug. 6, 2015

(51) Int. Cl.
| | |
|---|---|
| F21V 29/00 | (2015.01) |
| F21V 29/70 | (2015.01) |
| F21V 29/503 | (2015.01) |
| G03B 21/20 | (2006.01) |
| F21V 29/502 | (2015.01) |
| F21V 29/89 | (2015.01) |
| F21V 29/85 | (2015.01) |
| G03B 21/16 | (2006.01) |

(Continued)

(52) U.S. Cl.
CPC .......... *F21V 29/503* (2015.01); *F21V 29/502* (2015.01); *F21V 29/70* (2015.01); *F21V 29/85* (2015.01); *F21V 29/89* (2015.01); *G03B 21/16* (2013.01); *G03B 21/204* (2013.01); *F21V 9/16* (2013.01); *F21Y 2115/10* (2016.08); *F21Y 2115/30* (2016.08); *Y10T 29/49863* (2015.01); *Y10T 29/49865* (2015.01)

(58) Field of Classification Search
CPC .. G03B 21/2033; G03B 21/16; G03B 21/204; F21V 29/503; F21V 29/502; F21V 29/70; F21V 29/85; F21V 29/89; F21V 9/16
USPC ..... 362/373, 249.01, 249.02, 294, 382, 218; 361/704, 707, 708, 709, 710
See application file for complete search history.

(56) References Cited

U.S. PATENT DOCUMENTS 4,700,273 A * 10/1987 Kaufman ............ H01L 23/3735
257/668
6,114,048 A    9/2000 Jech et al.
(Continued)

FOREIGN PATENT DOCUMENTS

| JP | 2011103353 A | 5/2011 |
|---|---|---|
| WO | 2011095919 A1 | 8/2011 |
| WO | 2013038964 A1 | 3/2013 |

OTHER PUBLICATIONS

Corresponding European Patent Application No. 15152878.3 dated May 28, 2015.

*Primary Examiner* — Anh Mai
*Assistant Examiner* — Arman B Fallahkhair
(74) *Attorney, Agent, or Firm* — Perry + Currier, Inc.

(57) ABSTRACT

A light emitting device with a heat sink composed of two materials is provided. The device comprises: a light emitting material; and, a heat sink comprising: a first material configured to cool the light emitting material, the first material comprising a first coefficient of thermal expansion (CTE); and, a second material bonded to the first material at an interface there between, the second material comprising a second CTE lower than the first CTE, the light emitting material bonded to the first material but not the second material.

13 Claims, 18 Drawing Sheets

(51) Int. Cl.
  *F21V 9/16*    (2006.01)
  *F21Y 115/30*  (2016.01)
  *F21Y 115/10*  (2016.01)

(56) References Cited

U.S. PATENT DOCUMENTS

| | | | | |
|---|---|---|---|---|
| 6,171,691 | B1* | 1/2001 | Nishibayashi | H01L 23/3732 |
| | | | | 257/E23.111 |
| 6,758,263 | B2* | 7/2004 | Krassowski | F28F 13/00 |
| | | | | 165/185 |
| 7,067,903 | B2* | 6/2006 | Tachibana | H01L 23/3732 |
| | | | | 257/625 |
| 7,219,721 | B2* | 5/2007 | Miyazaki | H01L 23/367 |
| | | | | 165/185 |
| 8,651,711 | B2* | 2/2014 | Rudisill | F21V 29/70 |
| | | | | 362/249.02 |
| 8,833,975 | B2* | 9/2014 | Kishimoto | F21S 48/115 |
| | | | | 362/260 |
| 9,179,578 | B2* | 11/2015 | Soyano | H01L 23/3672 |
| 9,316,388 | B2* | 4/2016 | Pastrik | F21V 29/70 |
| 2008/0283860 | A1 | 11/2008 | Suehiro | |
| 2011/0108857 | A1 | 5/2011 | Rindt et al. | |
| 2012/0057364 | A1 | 3/2012 | Kishimoto et al. | |
| 2012/0188518 | A1* | 7/2012 | Mukouyama | G03B 21/204 |
| | | | | 353/31 |
| 2015/0219870 | A1* | 8/2015 | Adema | G02B 7/006 |
| | | | | 359/892 |

\* cited by examiner

LIGHT EMITTING DEVICE WITH A HEAT SINK COMPOSED OF TWO MATERIALS

FIELD

The specification relates generally to light generation systems, and specifically to a light emitting device with a heat sink composed of two materials.

BACKGROUND

In a light excitation illumination system, such as a laser-ceramic phosphor system, a laser-quantum dot system, and the like, a light emitting material to heat sink bond can fail due to coefficient of thermal expansion (CTE) mismatches. In other words, the CTE of the heat sink is generally higher than the CTE of the light emitting material (e.g. phosphor, quantum dots etc.) so that, as temperature of the system increases during operation, the light emitting material expands at a lower rate than the heat sink, leading to thermo-mechanical failure of the system. Such problems can be managed by controlling power of an excitation light source, such as a laser, and/or by controlling the temperature of the system. Controlling power of the light source, however, can result in an overall reduction of light output of the system; controlling temperature can require complicated and/or expensive heat sinks and/or temperature management schemes and/or cooling schemes/equipment.

SUMMARY

In general, this disclosure is directed to a light emitting device that includes a light emitting material (including but not limited to a phosphor, quantum dots and the like) and a heat sink composed of two materials of different coefficients of thermal expansion (CTE). Such devices can be illuminated by high power lasers, and/or a plurality of low-power lasers, to generate light, a process which also generates heat and raises the temperature of the device. A first material of the heat sink, to which the light emitting material is bonded, generally has a higher CTE than the light emitting material which can lead to thermomechanical failure; however, the effective CTE of the heat sink is lowered by bonding the first material to a lower CTE material, for example a material that has a CTE that is similar to the CTE of the light emitting material.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XYY, YZ, ZZ, and the like). Similar logic can be applied for two or more items in any occurrence of "at least one . . . " and "one or more . . . " language.

A first aspect of the specification provides a device comprising: a light emitting material; and, a heat sink comprising: a first material configured to cool the light emitting material, the first material comprising a first coefficient of thermal expansion (CTE); and, a second material bonded to the first material at an interface there between, the second material comprising a second CTE lower than the first CTE, the light emitting material bonded to the first material but not the second material.

The interface can comprise one or more of: a bond in stress between the first material and the second material; a bond in tension between the first material and the second material; a bond in shear between the first material and the second material; a bond in peel between the first material and the second material; and, a bond in compression between the first material and the second material.

The device can further comprise apparatus for bonding the first material to the second material, the apparatus comprising at least one of: fasteners; screws, dowels; rivets; epoxy; adhesive; a weld located at the interface; solder located at the interface; and brazing located at the interface.

The first material can comprise an aperture, and the second material can be located in the aperture, the interface there between located at an edge of the aperture. The first material can surround the second material.

The first material can comprise at least one planar surface, and the second material can be bonded to the first material at the at least one planar surface.

The second material can be bonded to the first material at an outer edge of the first material, the interface there between located at the outer edge. The second material can surround the first material.

The first material can be non-planar on a side opposite the light emitting material, and the second material can be bonded to the side opposite the light emitting material.

The heat sink can comprise a cooling plate.

The heat sink can comprise a cooling drum.

The first material can comprise one or more of a first metal and aluminum, and the second material can comprise one or more of a second metal, stainless steel, copper-tungsten, an alloy of iron-nickel-cobalt, ceramic, and glass.

The device can further comprise a third material bonded to the second material at a respective interface there between, such that the second material is sandwiched between the first material and the third material, the third material comprising a third CTE lower than the second CTE.

Another aspect of the specification provides a method comprising: assembling a device comprising: a light emitting material; a heat sink configured to cool the light emitting material, the heat sink comprising: a first material configured to cool the light emitting material, the first material comprising a first coefficient of thermal expansion (CTE); and, a second material bonded to the first material at an interface there between, the second material comprising a second (CTE) lower than the first CTE, the light emitting material bonded to the first material but not the second material, by: applying stress to one or more of the first material and the second material at the interface; bonding the first material and the second material while the stress is being applied; and, bonding the light emitting material to the first material.

Applying the stress can comprise one or more of: raising a temperature of one or more of the first material and the second material; and applying mechanical stress to one or more of the first material and the second material.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
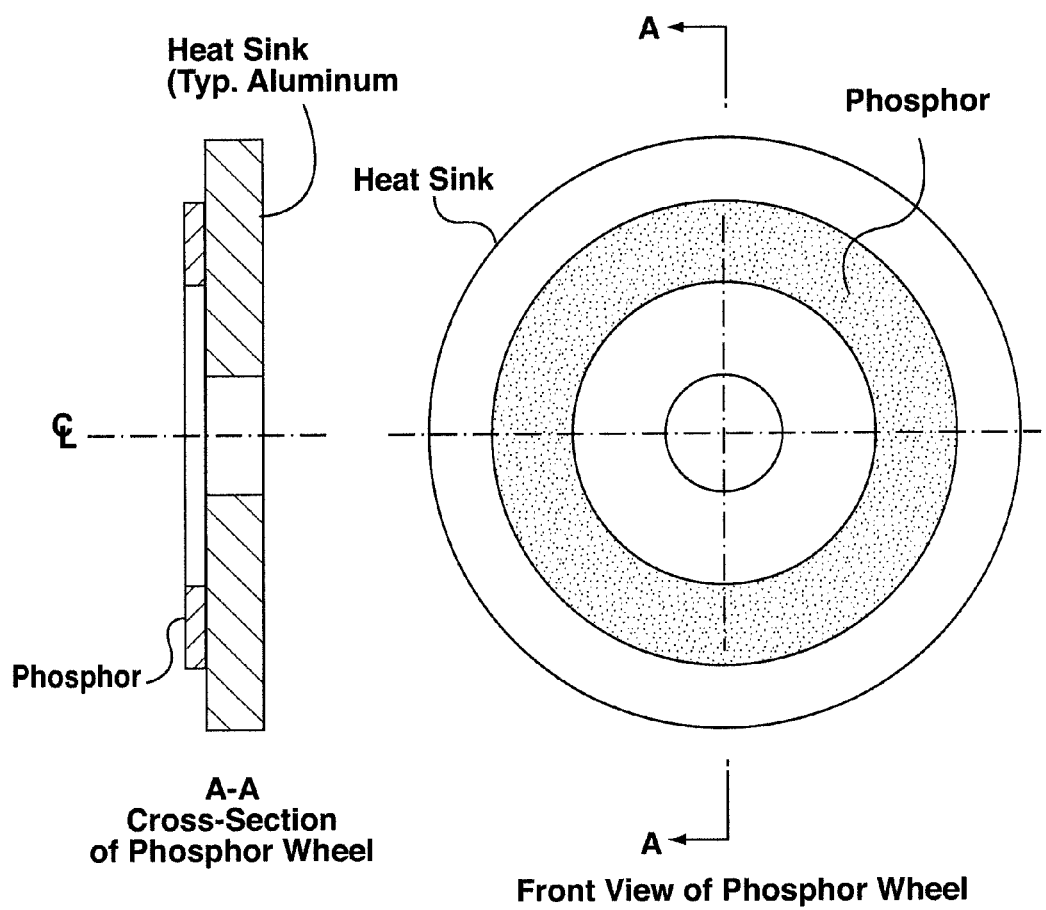
FIG. 1 depicts a front elevation view of a prior art device, comprising a light emitting wheel with eccentricity, and cross-section thereof.

FIG. 1 depicts a front elevation view of a light emitting device, and a cross-section thereof through a line A-A, according to the prior art. Specifically, the light emitting device comprises a phosphor wheel comprising a heat sink (about 1 mm thick) and a light emitting material, such as a phosphor (about 0.2 mm thick). The heat sink can comprise aluminum, which has a higher CTE (about 22 um/m-K) than phosphors (about 6 to 7 um/m-K) leading to thermo-mechanical failure of the light emitting device when the temperature of the light emitting devices rises during operation.

Figure 2:
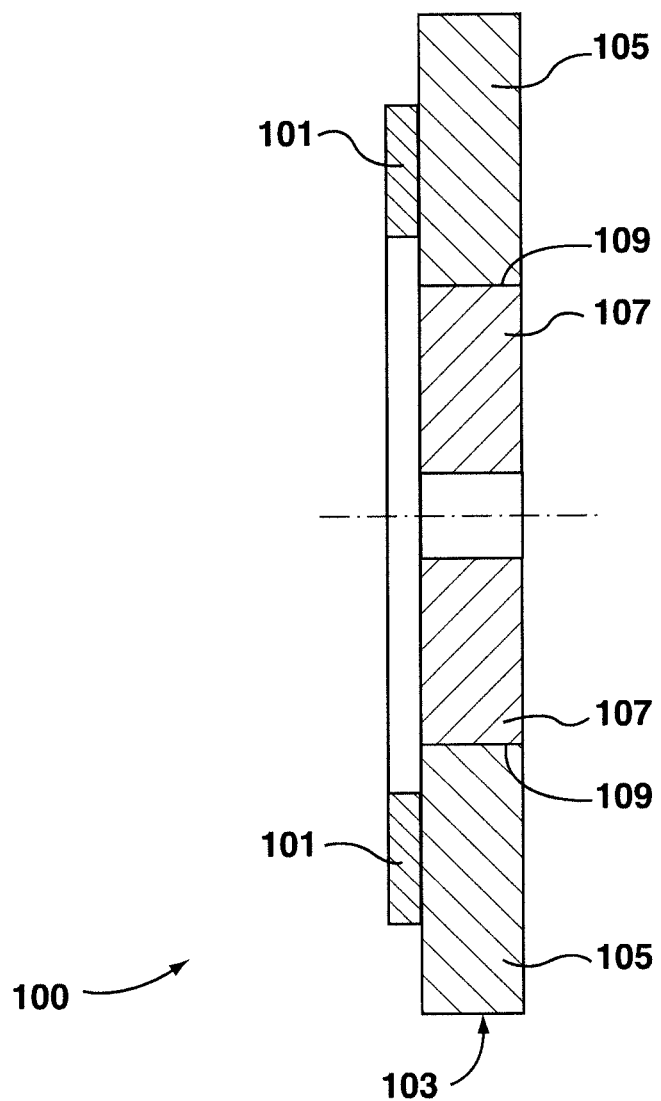
FIG. 2 depicts a cross-section of a light emitting device with a heat sink composed of two materials, according to non-limiting implementations.

Attention is next directed to FIG. 2, which depicts a cross-section of a device 100 that is similar the device of FIG. 1, however device 100 comprises: a light emitting material 101; and, a heat sink 103 comprising: a first material 105 configured to cool light emitting material 101, first material 105 comprising a first coefficient of thermal expansion (CTE); and, a second material 107 bonded to first material 105 at an interface 109 there between, second material 107 comprising a second CTE lower than the first CTE, light emitting material 101 bonded to first material 105 but not second material 107. Interface 109 can comprise a bond in tension and/or a bond in stress between first material 105 and second material 107; such tension and/or stress can be introduced when bonding occurs and/or such tension and/or stress can occur as device 100 heats up during operation. Relative sizes and thicknesses of elements in FIGS. 1 and 2 are appreciated to be not to scale. In general, device 100, as depicted, comprises a cooling plate, and specifically an annular cooling plate with an aperture there through, the aperture located at the geometric center of the device 100.

Light emitting material 101 can include, but is not limited to, one or more of a phosphor, a ceramic phosphor, quantum dots, a luminescent material, a fluorescent material, and the like; indeed, while present implementations will be described with regard to ceramic phosphors, other light emitting materials are within the scope of present implementations. Specifically, light emitting material 101 comprises any material that emits light of at least a first wavelength when excited by light of at least a second wavelength; in general, the first wavelength is longer than the second wavelength.

For example, in some implementations, light emitting material 101 can be configured for excitation by blue laser light, and emit light of a wavelength longer than the blue laser light, including, but not limited to, red light and green light. Further, in some implementations, light emitting material 101 comprises more than one light emitting material located, for example, in segments on heat sink 103. For example, one or more segments of light emitting material 101 can emit red light, while one or more other segments of light emitting material 101 can emit green light. For example, when device 100 comprises a light emitting wheel, as depicted, device 100 can turn and/or rotate so that the blue laser light, and the like interacts with the different segments of light emitting material 101.

Device 100 can generally be used in a projection system (not depicted), in which, for example, blue laser light excites light emitting material 101, which emits red light and/or green light and/or yellow light, the blue laser light, the emitted light providing RGB (red-green-blue) light and/or white light to the projection system. Alternatively, light emitting material 101 can emit blue light in the RGB/white system.

In general, the process of exciting light emitting material 101 to emit light results in the production of heat which is to be dissipated to prevent light emitting material 101 and heat sink 103 from heating up and/or to control a temperature of device 100. Hence, light emitting material 101 is located on heat sink 103, and specifically is bonded to first material 105 which is configured to cool light emitting material 101 from an interface between first material 105 and light emitting material 101. Hence, first material 105 generally comprises a material having thermal conduction properties for removing heat from light emitting material 101.

For example, light emitting material 101 can be bonded to first material 105 at an interface there between using any suitable process and/or bonding material including, but not limited to, welding, soldering, annealing and the like, and epoxies, glues and the like. For example, in some implementations, light emitting material 101 can comprise a block of phosphor comprising a phosphorescent material dispersed in matrix material. Such a block can be bonded to first material 105.

Heat then generally flows into first material 105 from the interface between light emitting material 101 and first material 105, the heat being dissipated at first material 105. Hence, first material 105 comprises one or more of a heat sink, a block, a wheel, a ring, and a water-block configured to cool light emitting material 101. First material 105 can comprise any material configured to cool light emitting material 101 including, but not limited to, metal, aluminum, steel and the like. Further, as depicted, first material 105 comprises a plate of material with nominally circular symmetry, though other shapes are within the scope of present implementations, including, but not limited to, a square, a rectangle and the like. Indeed shapes that do not have circular symmetry are within the scope of present implementations: for example, device 100 can be rectangular, with adjacent segments of different light emitting material; in these implementations device 100 can be configured to translate in one or more directions so that the segments can interact with the laser light, and the like.

In some implementations, first material 105 comprises a mirror and/or a reflective surface for reflecting the emitted light from light emitting material 101, and any non-absorbed laser light, away from first material 105. For example, light emitted from light emitting material 101 can be emitted in all directions, including towards first material 105; first material 105 can comprise a mirror, at least in an area of light emitting material 101, for reflecting emitted light impinging thereupon away from first material 105. Hence, first material 105 can comprise a polished metal at least in the area of light emitting material 101.

In general, however, there is a thermal mismatch between light emitting material 101 and first material 105. For example, ceramic phosphor materials can have a coefficient of thermal expansion (CTE) about 6 to 7 um/m-K, while first material 105 generally comprises a metal, including but not limited to aluminum, with a CTE of about 22 um/m-K. Hence, when the temperature of device 100 rises, light emitting material 101 expands at a slower rate than first material 105, which can lead to mechanical failure of device 100: i.e. light emitting material 101 can delaminate and the like from first material 105. Such failure can occur under high light intensity conditions, for example when light impinging on light emitting material 101 is above a given intensity. Alternatively, heating of the phosphor and/or light emitting material can damage the light emitting properties thereof.

To mitigate thermal expansion of first material 105, heat sink 103 generally comprises second material 107 bonded to first material 105, second material 107 having a lower CTE than first material 105, as described in further detail below.

As depicted, first material 105 is annular (similar to the device of FIG. 1) and hence comprises an aperture, and second material 107 is located in the aperture, interface 109 there between located at an edge of the aperture. As depicted, second material 107 is also annular, though second material 107 need not be annular; for example second material 107 could be circular and/or cylindrical. Hence, heat sink 103 comprises a first annulus of first material 105, an inner edge of the annulus bonded to an outer edge of a second annulus of second material 107, interface 109 located along inner edge of the first annulus and the outer edge of the second annulus. In other words, first material 105 surrounds second material 107 and is bonded thereto.

As described above, first material 105 comprises one or more of a first metal and aluminum, and second material 107 comprises one or more of a second metal, stainless steel, copper-tungsten, an alloy of iron-nickel-cobalt (e.g. Kovar™), ceramic, and glass (as long as the CTE of first material 105 is greater than the CTE of second material 107). CTE of second material 107 can be about the CTE of light emitting material 101; in other words the CTE of second material 107 can be about matched to the CTE of light emitting material 101. For example, in some implementations, CTE of second material 107 can be about 4 um/m-K and/or less than or about equal to a CTE of light emitting material 101, and less than a CTE of first material 105. However, CTE of second material 107 can also be between the CTE of light emitting material 101 and the CTE of first material 105.

Bonding of first material 105 to second material 107 at interface 109 can be implemented using various apparatus and/or techniques for bonding. For example, device 100 can further comprise apparatus for bonding first material 105 to second material 107, the apparatus including, but not limited to, at least one of: fasteners; screws; dowels; rivets; epoxy; adhesive; a weld located at interface 109; solder located at interface 109; and brazing located at interface 109. Furthermore, interface 109 can be abrupt (e.g. a step function from first material 105 to second material 107) or gradual, for example a mixture of first material 105 and second material 107. Indeed, in some implementations, interface 109 can comprise a gradual transition (including, but not limited to a linear transition) from first material 105 to second material 107, in order to mitigate stress at interface 109.

In some implementation, heat sink 103 is assembled so that there is stress at interface 109 between first material 105 and second material 107. For example, a temperature of first material 105 can be raised during assembly while a temperature of second material 107 is at room temperature and/or less than a temperature of first material 105. While a temperature of first material 105 is at a higher temperature, a diameter of an aperture of first material 105 increases, and a diameter of second material 107 can be about the same diameter, second material 107 bonded to first material 105 while the temperature of the first material 105 is raised. When first material 105 cools, there will be tension and/or stress at interface 109. Hence, in these implementations, interface 109 can also be referred to as a bond in tension. For example, first material 105 and second material 107 can be bonded at interface 109 in a manner that causes second material to prevent first material 105 from expanding when heated using tension forces.

However, other methods for introducing a bond in tension at interface 109 are within the scope of present implementations. For example, first material 105 can be bonded to second material 107 when one or both of first material 105 and second material 107 are under mechanical stress.

If such stress and/or tension is not introduced during assembly, such tension and/or stress can be introduced when bonding occurs and/or such tension and/or stress can occur as device 100 heats up during operation. Hence the bond at interface 109 can be referred to as a bond in stress and/or a bond in tension regardless of how device 100 is assembled.

Either way, as second material 107 will expand at a slower rate than first material 105 when heated, expansion of first material 105 is reduced when bonded to second material 107.

Figure 3:
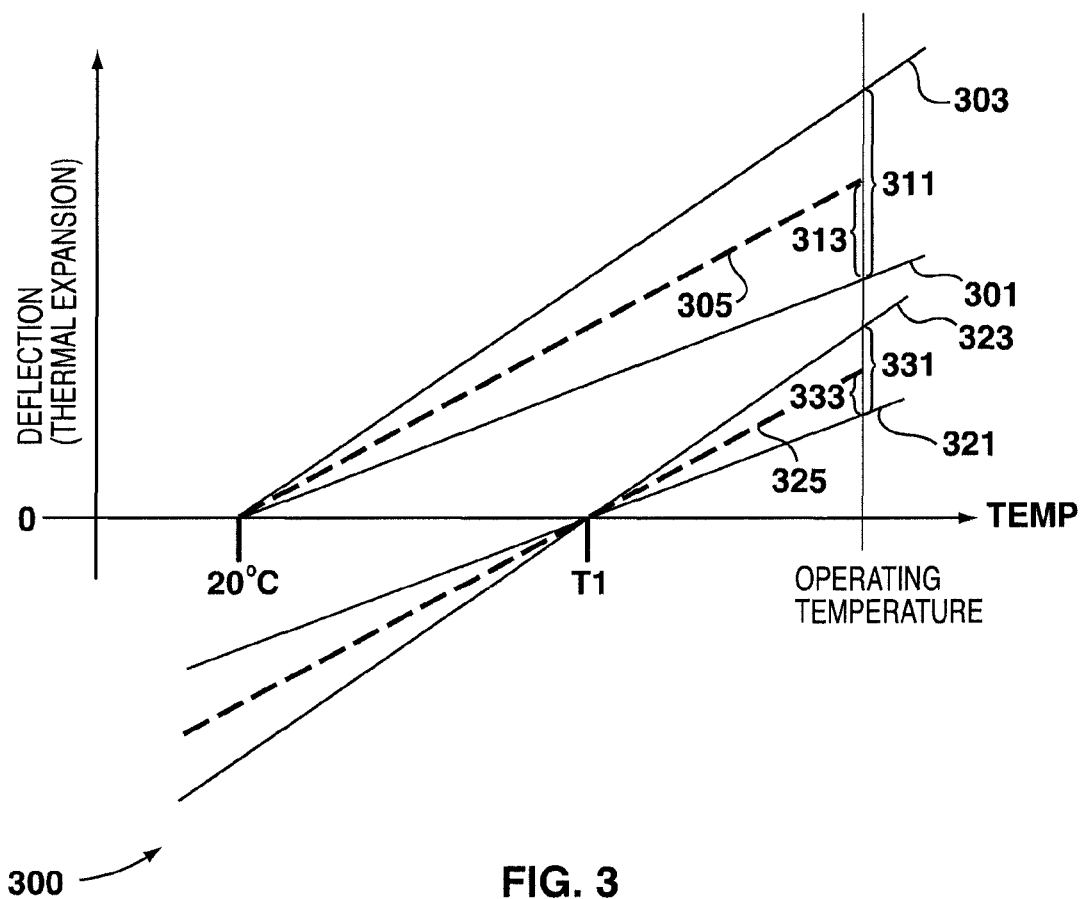
FIG. 3 depicts a graph comparing thermal expansion of the devices of FIGS. 1 and 2, according to non-limiting implementations.

The effect of heat sink 103 comprising first material 105 and second material 107 is illustrated in FIG. 3, which depicts a graph 300 showing deflection (i.e. thermal expansion, in arbitrary/relative units) of each of light emitting material 101, the heat sink of the device of FIG. 1, and heat sink 103, as a function of temperature. It is assumed in FIG. 3 that the device of FIG. 1 comprises the same light emitting material 101 as device 100.

Curve 301 represents thermal expansion of light emitting material 101 as a function of temperature, curve 303 represents thermal expansion of the heat sink of the device of FIG. 1 as a function of temperature, and curve 305 represents thermal expansion of heat sink 103 as a function of temperature; for each of curves 301, 303, 305 it is assumed, that device 100 (and device of FIG. 1) was assembled at about 20° C. and/or room temperature (and alternatively, in a manner that introduces a bond in stress at interface 109), and that temperature of device 100 is raised, for example during operation, to a operating temperature, for example, a steady-state temperature at which each of light emitting material 101, first material 105 and second material 107 operate when excitation light (e.g. blue laser light) is impinging on light emitting material 101 to produce emitted light. Hence, at about 20° C., there is no difference between each of curves 301, 303, 305.

While, in some implementations, each of light emitting material 101, first material 105 and second material 107 can operate at a different operating temperature due to differences in how heat flows through device 100, it is assumed that each of light emitting material 101, first material 105 and second material 107 have the same operating temperature.

In general, curve 305 has a slope less than curve 303, indicating that the effective CTE of heat sink 103, composed of both first material 105 and second material 107, with a bond in tension at interface 109, is less than the CTE of the heat sink of the device of FIG. 1. Hence, the effect of bonding second material 107 to heat sink 103 is lower the effective CTE of heat sink 103.

Furthermore, at the operating temperature, which is greater than 20° C. and/or room temperature and/or the temperature at which device 100 was assembled, a difference 311 between curves 301, 303 is greater than a difference 313 between curves 301, 305, indicating that the thermal mismatch between light emitting material 101 and heat sink 103 has been reduced as compared to the device in FIG. 1. The reduction in difference 313, as compared to difference 311, represents a reduction in stress between light emitting material 101 and heat sink 103, as compared to the device of FIG. 1.

Alternatively, device 100 can be assembled at a temperature T1 higher than room temperature and/or about 20° C., and hence graph 300 also depicts thermal expansion curves 321, 323, 325 for, respectively, each of light emitting material 101, the heat sink of the device of FIG. 1, and heat sink 103, assuming that that device 100 (and device of FIG. 1) was assembled at a temperature of T1 greater than about 20° C. and/or room temperature (and, alternatively, in a manner that introduces a bond in stress at interface 109), and that temperature of device 100 is raised, for example during operation, to the operating temperature. Hence, at temperature T1, there is no difference between each of curves 301, 303, 305, though at about 20° C. and/or room temperature, there is difference between the curves; hence, T1 is generally a temperature where, when cooled to room temperature, mechanical failure does not occur between light emitting material 101 and a corresponding heat sink. T1 is generally greater than room temperature but less than the operating temperature though, in some implementations, T1 can be about the operating temperature, presuming thermo-mechanical failure does not occur when device 100 is cooled.

Curve 321 represents thermal expansion of light emitting material 101 as a function of temperature, curve 323 represents thermal expansion of the heat sink of the device of FIG. 1 as a function of temperature, and curve 325 represents thermal expansion of heat sink 103 as a function of temperature (again assuming that device 100, and device of FIG. 1, were assembled at T1).

In general, curve 325 has a slope less than curve 323, indicating that the effective CTE of heat sink 103, composed of both first material 105 and second material 107 (and alternatively, with a bond in tension at interface 109), is less than the CTE of the heat sink of the device of FIG. 1, similar to curves 305, 303. Hence, again, the effect of bonding second material 107 to heat sink 103 is lower the effective CTE of heat sink 103.

Furthermore, at the operating temperature, which is greater T1, a difference 331 between curves 321, 323 is greater than a difference 333 between curves 321, 325, indicating that the thermal mismatch between light emitting material 101 and heat sink 103 has been reduced as compared to the device in FIG. 1.

In general, the effective $CTE_{HS}$ of heat sink 103 is a function of $CTE_1$ and $CTE_2$:

$$CTE_{HS} = F(CTE_1, CTE_2) \qquad \text{Equation 1}$$

where, $CTE_1$ is the CTE of first material 105, and $CTE_2$ is the CTE of second material 107, and F is a function that can depend on the stress and/or tension and/or geometry of interface 109 and/or device 100.

Figure 4:
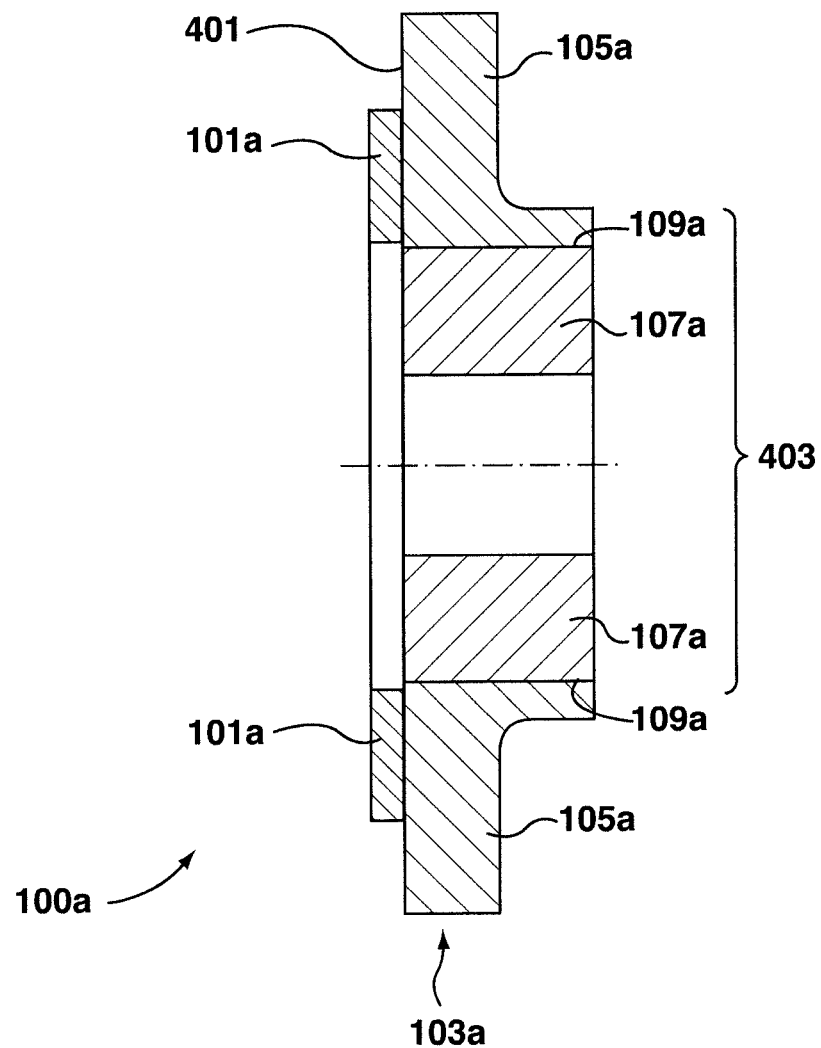
FIG. 4 depicts a cross-section of a light emitting device with a heat sink composed of two materials, according to alternate non-limiting implementations.

Attention is next directed to FIG. 4, which depicts a cross-section of a device 100a, substantially similar to device 100, with like elements having like numbers, however with an "a" appended thereto. Device 100a hence comprises: a light emitting material 101a; and, a heat sink 103a comprising: a first material 105a configured to cool light emitting material 101a, first material 105a comprising a first CTE; and, a second material 107a bonded to first material 105a at an interface 109a there between, second material 107a comprising a second CTE lower than the first CTE, light emitting material 101a bonded to first material 105a but not second material 107a. As with interface 109, interface 109a can comprise a bond in tension and/or a bond in stress between first material 105a and second material 107a.

However, in contrast to device 100, where heat sink 103 comprises a plate, heat sink 103a of device 100a comprises a planar surface 401 at a side where light emitting material 101a is located, and a hub 403 extending from on opposite surface, hub 403 formed by a combination of first material 105a and second material 107a. In other words, hub 403 extends interface 109a out from surface 401 in a direction opposite light emitting material 101a to increase surface area of interface 109a as compared to interface 109. The increase in surface can further change the effective CTE of heat sink 103a, as compared to heat sink 103 (i.e. the function of F of Equation 1 changes with the geometry of device 100).

Figure 5:
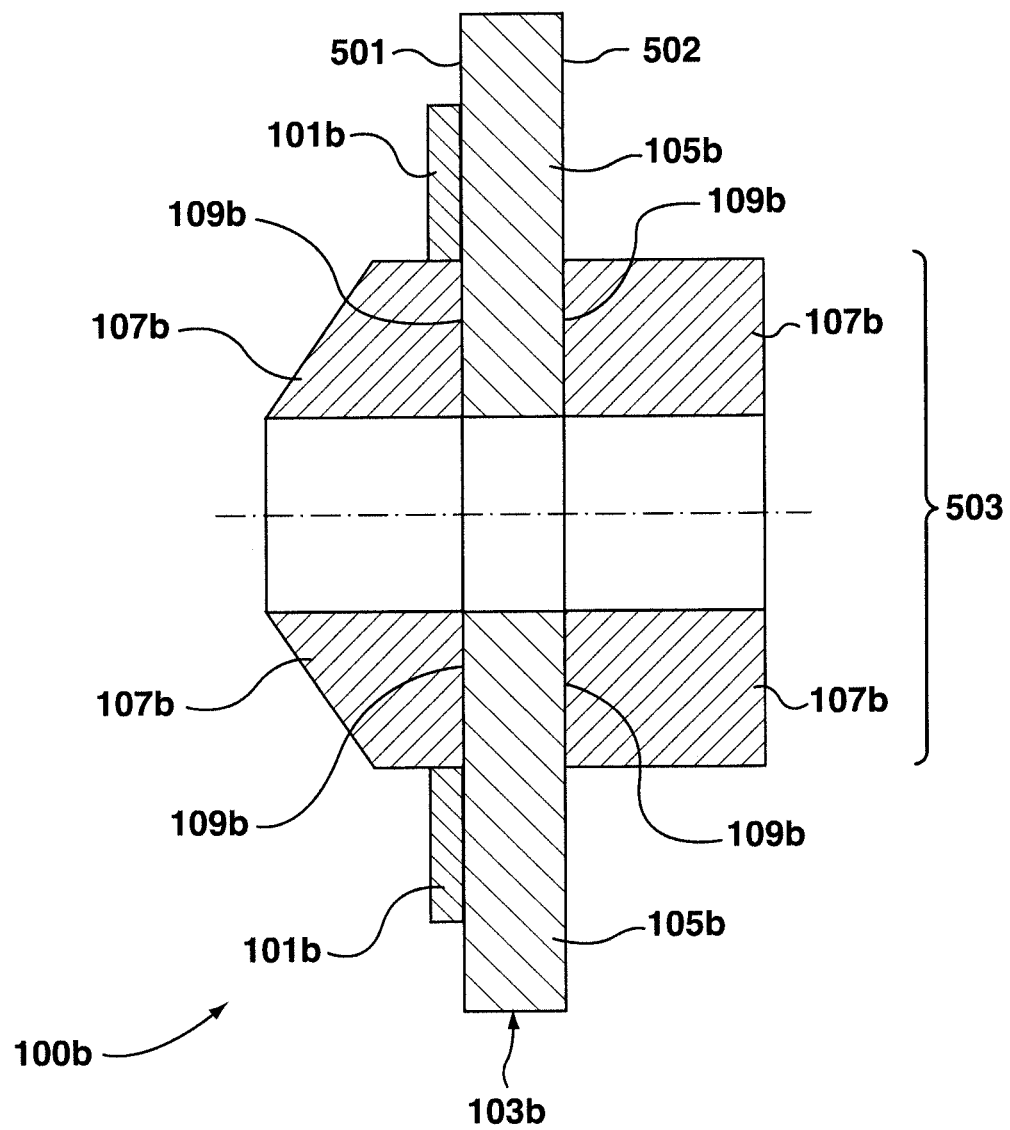
FIG. 5 depicts a cross-section of a light emitting device with a heat sink composed of two materials, according to alternate non-limiting implementations.

Attention is next directed to FIG. 5, which depicts a cross-section of a device 100b, substantially similar to device 100, with like elements having like numbers, however with a "b" appended thereto. Device 100b hence comprises: a light emitting material 101b; and, a heat sink 103b comprising: a first material 105b configured to cool light emitting material 101b, first material 105b comprising a first CTE; and, a second material 107b bonded to first material 105*b* at an interface 109*b* there between, second material 107*b* comprising a second CTE lower than the first CTE, light emitting material 101*b* bonded to first material 105*b* but not second material 107*b*. As with interface 109, interface 109*b* can comprise a bond in stress between first material 105*b* and second material 107*b*, however, as will presently be explained, interface 109*b* can comprise a bond in shear, rather than a bond in tension.

Specifically, first material 105*b* comprises at least one planar surface, and specifically as depicted a first planar surface 501, and a second planar surface 502; and, second material 107*b* is bonded to one or more of planar surfaces 501, 502. Generally, first material 105*b* comprises a plate with light emitting material 101*b* bonded to first planar surface 501. As depicted, second material 107*b* comprises two portions respectively bonded to each of first planar surface 501 and second planar surface 502. Indeed, both of first material 105*b* and second material 107*b* comprise a common aperture, with second material 107*b* and the aperture forming a hub 503.

In other words, first material 105*b* is sandwiched between two portions of second material 107*b*, each portion of second material 107*b* bonded to first material 105*b* on opposing sides.

In any event, in contrast to interfaces 109, 109*a*, interface 109*b* comprises two interfaces: a first interface between a first portion of second material 107*b* and first planar surface 501, and a second interface between a second portion of second material 107*b* and second planar surface 502. In other words, CTE of heat sink 103*b* is reduced, as compared to CTE of heat sink of device of FIG. 1, using shear, rather than tension as in devices 100, 100*a*. For example, first material 105*b* and second material 107*b* are bonded at interface 109*b* so that second material 107*b* prevents and/or reduces expansion of first material 105*c* when heated using shear forces (i.e. second material 107*b* assists in reducing radial expansion of first material 105*b*).

Figure 6:
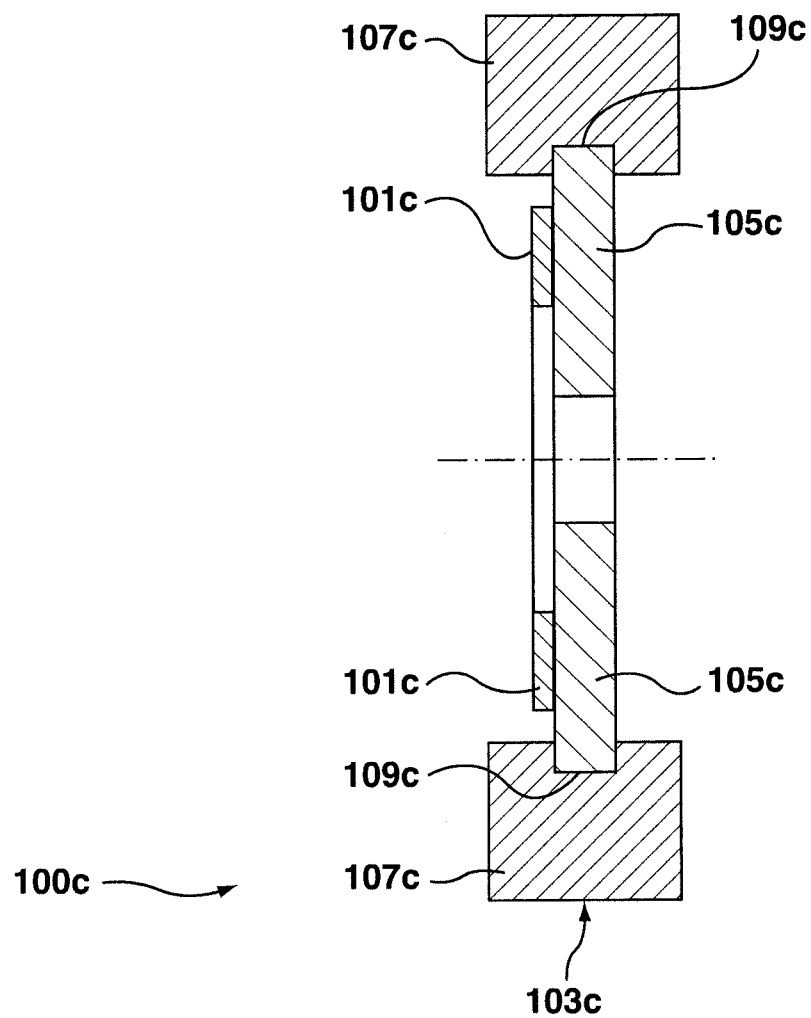
FIG. 6 depicts a cross-section of a light emitting device with a heat sink composed of two materials, according to alternate non-limiting implementations.

Attention is next directed to FIG. 6, which depicts a cross-section of a device 100*b*, substantially similar to device 100, with like elements having like numbers, however with a "c" appended thereto. Device 100*c* hence comprises: a light emitting material 101*c*; and, a heat sink 103*c* comprising: a first material 105*c* configured to cool light emitting material 101*c*, first material 105*c* comprising a first CTE; and, a second material 107*c* bonded to first material 105*c* at an interface 109*c* there between, second material 107*c* comprising a second CTE lower than the first CTE, light emitting material 101*c* bonded to first material 105*c* but not second material 107*c*. As with interface 109, interface 109*c* can comprise a bond in stress between first material 105*c* and second material 107*c*, however, as will presently be explained, interface 109*b* can comprise a bond in compression.

In contrast to device 100, however, at device 100*c*, second material 107*c* is bonded to first material 105*c* at an outer edge of first material 105*c*, interface 109*c* there between located at the outer edge. In other words, first material 105*c* comprises a plate, an annulus, and the like, and second material 107*c* comprises an annulus surrounding first material 105*c*, and bonded to an outer edge of first material 105*c*. Hence, second material 107*c* surrounds first material 105*c*, effectively compressing first material 105*c* at interface 109*c* at least when first material 105*c* expands during heating. Put another way, second material 107*c* comprises an annulus having an inner diameter and/or slot (as depicted), and first material 105*c* comprises a disc and/or circle and/or plate and/or annulus having an outer diameter, the outer diameter of first material 105*c* about the same as the inner diameter of second material 107*c* and/or the slot. In implementations where second material 107*c* comprises a slot at an inner diameter, the slot is complementary to first material 105*c* and receives first material 105*c* therein. Put another way, second material 107*c* comprises a band around first material 105*c*.

Further, first material 105*c* and second material 107*c* are bonded at interface 109*c* in a manner that causes second material to compress first material 105*c*, at least when first material 105*c* is heated, thereby constraining first material 105*c* from expanding when heated.

Figure 7:
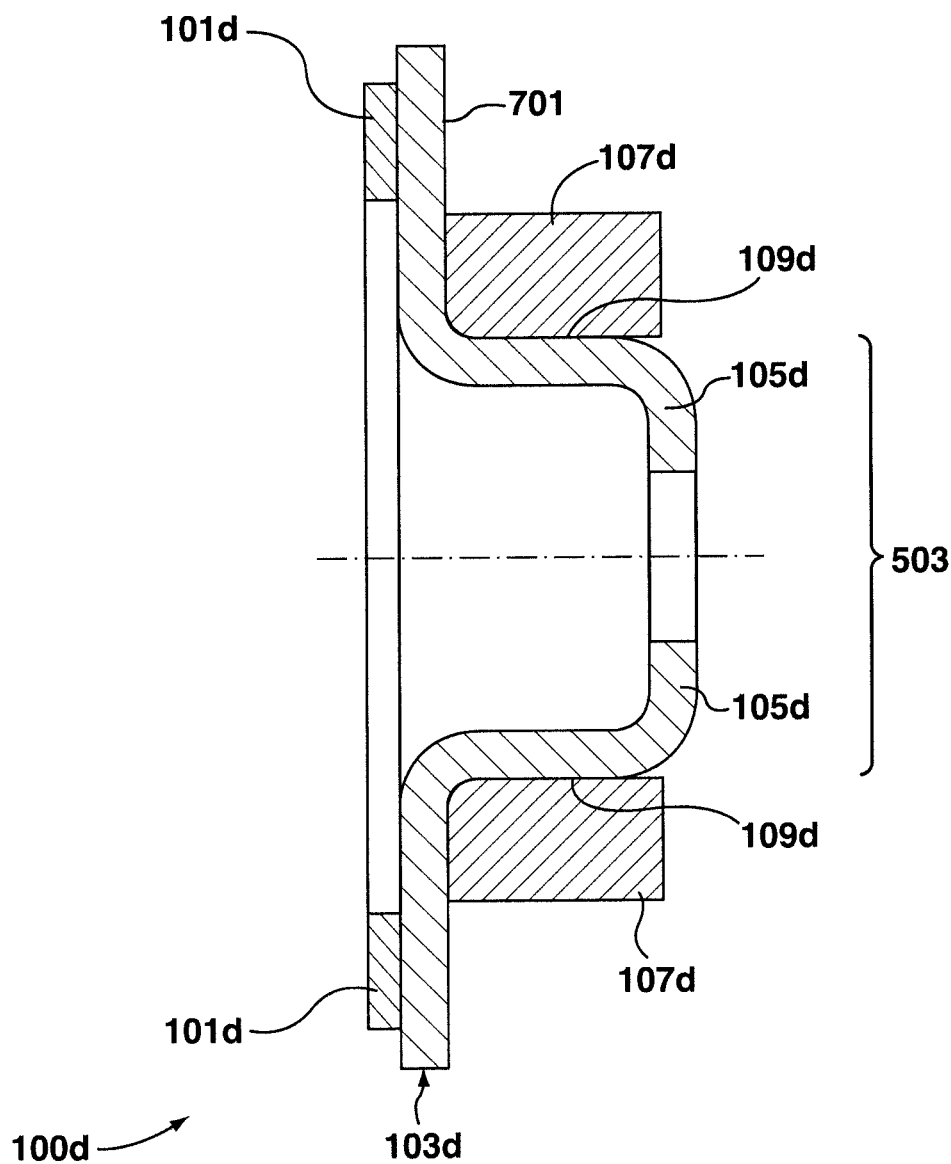
FIG. 7 depicts a cross-section of a light emitting device with a heat sink composed of two materials, according to alternate non-limiting implementations.

Attention is next directed to FIG. 7, which depicts a cross-section of a device 100*d*, substantially similar to device 100, with like elements having like numbers, however with a "d" appended thereto. Device 100*d* hence comprises: a light emitting material 101*d*; and, a heat sink 103*d* comprising: a first material 105*d* configured to cool light emitting material 101*d*, first material 105*d* comprising a first CTE; and, a second material 107*d* bonded to first material 105*d* at an interface 109*d* there between, second material 107*d* comprising a second CTE lower than the first CTE, light emitting material 101*d* bonded to first material 105*d* but not second material 107*d*. As with interface 109, interface 109*d* can comprise a bond in stress between first material 105*d* and second material 107*d*, however, as will presently be explained, interface 109*b* can comprise both a bond in compression and a bond in shear.

However, in contrast to device 100, first material 105*d* is non-planar on a side 701 opposite light emitting material 101*d*, and second material 107*d* is bonded to side 701. Specifically, first material 105*d* forms a hub 703 that extends about perpendicularly out from side 701, which is otherwise planar. As depicted, interface 109*d* is between second material 107*d* and first material 105*d* along hub 703, and between second material and a planar portion of side 701 adjacent hub 703. For example, second material 107*d* comprises a band surrounding and bonded to hub 703, the band also bonded to a planar portion of side 701.

Hence, a portion of interface 109*d* at hub 703 can comprise a bond in compression, as second material 107*d* compresses first material 105*d* at hub 703, similar to device 100*c*; and a portion of interface 109*d* at a planar portion of side 701 can comprise a bond in shear, as second material 107*d* provides a shear force along the planar portion of side 701, similar to device 100*b*.

In general, a non-planar heat sink, as in devices 100*a*, 100*b*, 100*c*, 100*d* can assist in managing build-up of internal stress and prevent distortion due to bonds in stress, as compared to a planar heat sink as in device 100.

Heretofore, devices have been described that each comprise a light emitting material wheel and/or phosphor wheel, however other geometries are within the scope of present implementations, including, but not limited to, drums, cooling drums, blocks, and cooling blocks, as will be described hereafter.

Figure 8:
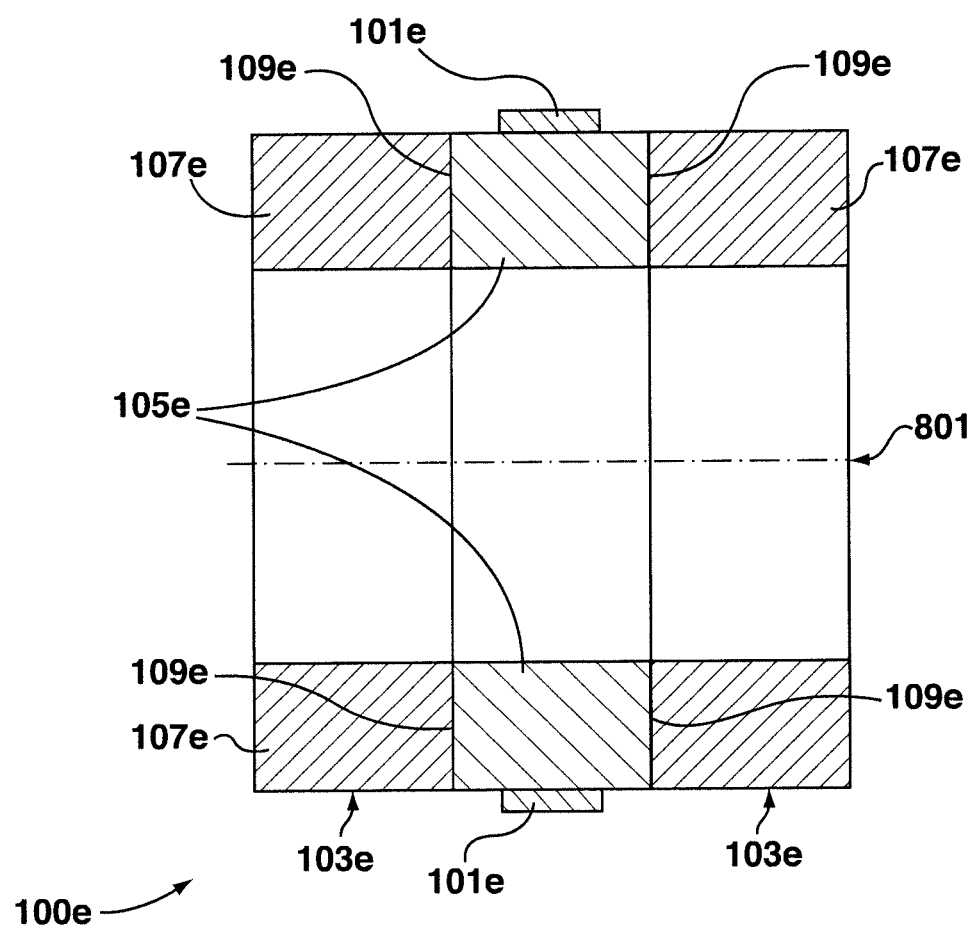
FIG. 8 depicts a cross-section of a light emitting device with a heat sink composed of two materials, according to alternate non-limiting implementations.

Attention is next directed to FIG. 8, which depicts a cross-section of a device 100*e* that is similar to device 100 with like elements having like numbers, however with an "e" appended thereto. Device 100*e* hence comprises: a light emitting material 101*e*; and, a heat sink 103*e* comprising: a first material 105*e* configured to cool light emitting material 101*e*, first material 105*e* comprising a first CTE; and, a second material 107*e* bonded to first material 105*e* at an interface 109*e* there between, second material 107*e* comprising a second CTE lower than the first CTE, light emitting material 101*e* bonded to first material 105*e* but not second material 107*e*. As with interface 109, interface 109*e* can comprises a bond in stress between first material 105*e* and second material 107*e*, however, as will presently be explained, interface 109*e* can comprises a bond in shear and, in some implementations, a bond in compression.

However, in contrast to device 100, device 100*e* comprises a drum, and specifically a cooling drum: in other words, device 100*e* comprises an aperture 801 there through, with drum being cylindrically symmetric about a longitudinal axis passing through a center of aperture 801. First material 105*e* comprises a first drum, with light emitting material 101*e* located on and/or bonded to an outside and/or external surface of first material 105*e*; for example, light emitting material 101*e* can comprise a band around first material 105*e*. In operation, device 100*e* is generally rotated about the longitudinal axis and excitation light excites light emitting material 101*e*.

Second material 107*e* comprises a first respective drum and a second respective drum bonded to sides (e.g. a left side and a right side with respect to FIG. 8) of the first drum of first material 105*e*. Interface 109*e* hence comprises two interfaces on both sides of first material 105*e*, reducing radial expansion of first material 105*e*. Hence, interface 109 can comprise a bond in shear.

In some implementations, a fastener and the like can be used to join and/or connect the two portions of second material 107*e*; for example via holes and the like through first material 105*e*. In these implementations, interface 109*e* can further comprise a bond in compression to reduce expansion of first material 105*e* along the longitudinal axis.

Figure 9:
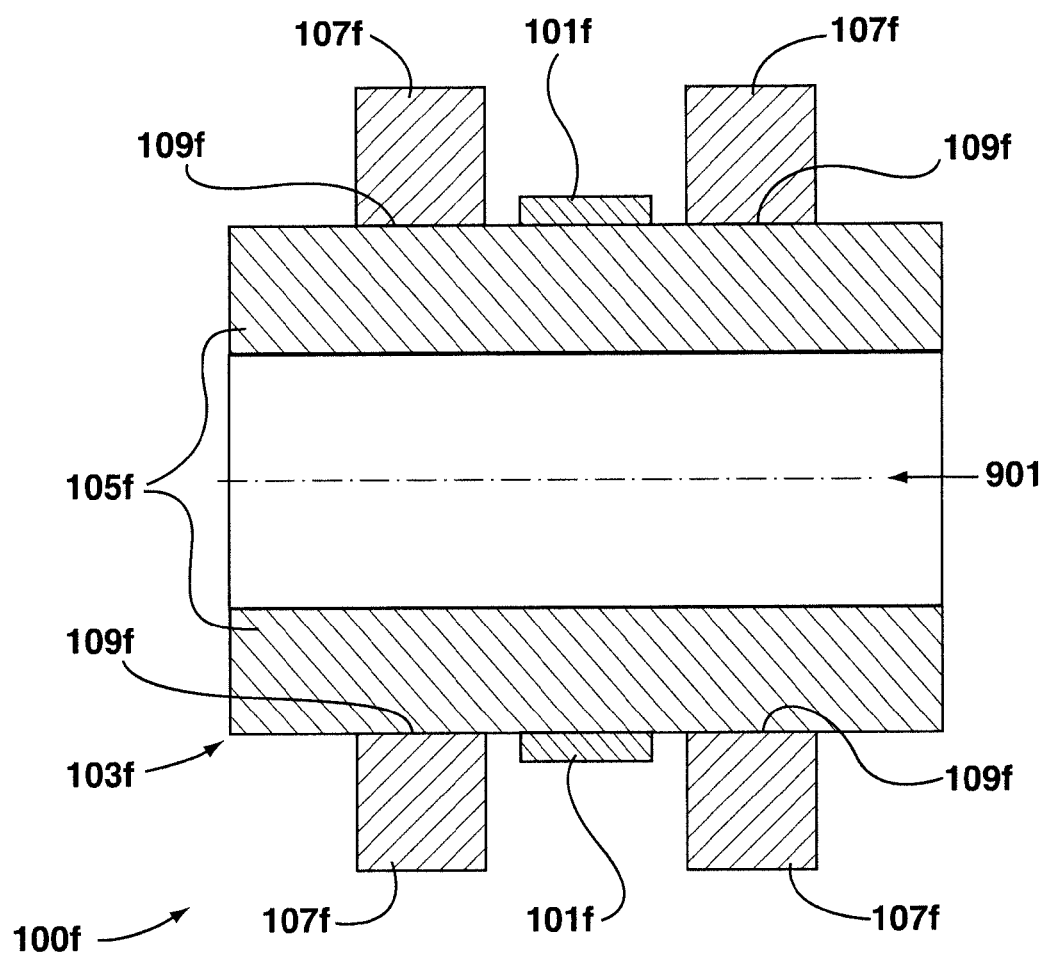
FIG. 9 depicts a cross-section of a light emitting device with a heat sink composed of two materials, according to alternate non-limiting implementations.

Attention is next directed to FIG. 9, which depicts a cross-section of a device 100*f* that is similar to device 100*e* with like elements having like numbers, however with an "f" appended thereto. Device 100*f* hence comprises: a light emitting material 101*f*; and, a heat sink 103*f* comprising: a first material 105*f* configured to cool light emitting material 101*f*, first material 105*f* comprising a first CTE; and, a second material 107*f* bonded to first material 105*f* at an interface 109*f* there between, second material 107*f* comprising a second CTE lower than the first CTE, light emitting material 101*f* bonded to first material 105*f* but not second material 107*e*. As with interface 109, interface 109*f* can comprises a bond in stress between first material 105*f* and second material 107*f*, however, as will presently be explained, interface 109*f* can comprise a bond in compression.

As with device 100*e*, device 100*f* comprises a drum with an aperture 901 there through, with drum being cylindrically symmetric about a longitudinal axis passing through a center of aperture 901. First material 105*f* comprises a first drum, with light emitting material 101*f* located on and/or bonded to an outside and/or external surface of first material 105*f* (i.e. light emitting material 101*f* can comprise a band around first material 105*f*).

Second material 107*f* comprises one or more bands surrounding first material 105*f*, similar to device 100*c*; as depicted, second material 107*f* comprises two bands on either side of light emitting material 101*f*. Interface 109*f* hence comprises two interfaces, between each of the bands of second material 107*f* and an external surface of first material 105*f*, compressing first material 105*f* and thereby reducing radial expansion of first material 105*f*. Hence, interface 109*f* can comprise a bond in compression.

Figure 10:
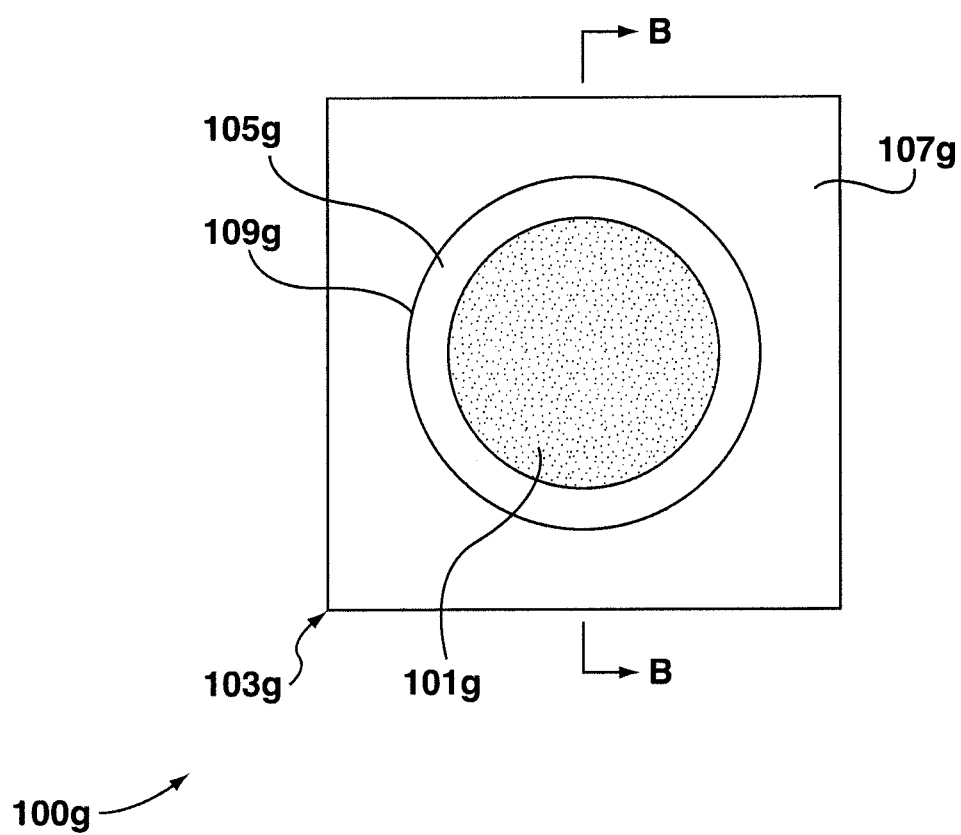
FIG. 10 depicts a front elevation view of a light emitting device with a heat sink composed of two materials, according to alternate non-limiting implementations.
Figure 11:
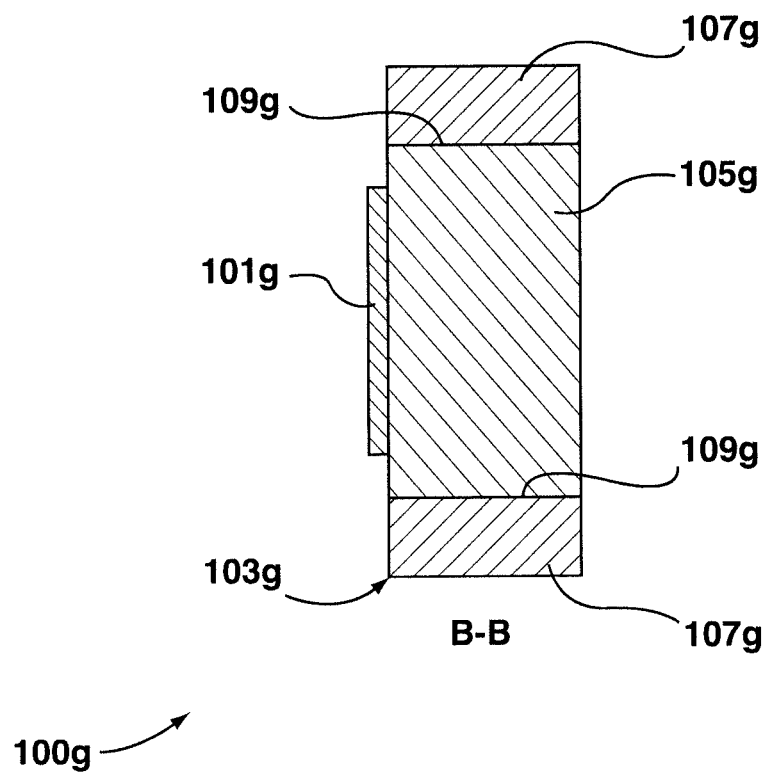
FIG. 11 depicts a cross-section of the device of FIG. 10, according to non-limiting implementations.

Attention is next directed to FIGS. 10 and 11, which respectively depict a front elevation view and a cross-section of a device 100*g* that is similar to device 100 with like elements having like numbers, however with a "g" appended thereto. The cross-section of FIG. 11 is through line B-B of FIG. 10. Device 100*g* hence comprises: a light emitting material 101*g*; and, a heat sink 103*g* comprising: a first material 105*g* configured to cool light emitting material 101*g*, first material 105*g* comprising a first CTE; and, a second material 107*g* bonded to first material 105*g* at an interface 109*g* there between, second material 107*g* comprising a second CTE lower than the first CTE, light emitting material 101*g* bonded to first material 105*g* but not second material 107*g*. As with interface 109, interface 109*g* can comprise a bond in stress between first material 105*g* and second material 107*g*, however, as will presently be explained, interface 109*g* can comprise a bond in compression.

Further, in contrast to previous devices described herein, device 100*g* comprises a block and/or a cooling block, which can alternatively rotate and/or be linearly translated in one or more directions when excitation light is impinging on light emitting material 101*g*.

As best seen in FIG. 11, first material 105*g* comprises a cylindrical block, with light emitting material 101*g* bonded thereto, though first material 105*g* need not be cylindrical; for example, first material 105*g* can be rectangular and/or square in cross section, and the like.

As best seen in FIG. 10, second material 107*g* surrounds first material 105*g*; hence second material 107*g* comprises an aperture where first material 105*g* is located, with interface 109*g* formed between the outer diameter of first material 105*g* and an inner diameter of the aperture of second material 107*g*. Hence, similar to device 100*c*, interface 109*g* comprises a bond in compression, and reduces radial expansion of first material 105*g* when heated.

Each respective interface between a higher CTE material and a lower CTE material of a heat sink described herein comprises a bond in stress and/or a bond in which stress is introduced when a temperature of the heat sink changes. However, the nature of the stress can vary with the geometry of the heat sink and/or the location of the higher CTE material with respect to the lower CTE material. Specifically, each interface can comprise one or more of: a bond in stress between a first material and a second material; a bond in tension between the first material and the second material; a bond in shear between the first material and the second material; a bond in peel between the first material and the second material; bond in compression between the first material and the second material; and the like.

Figure 12:
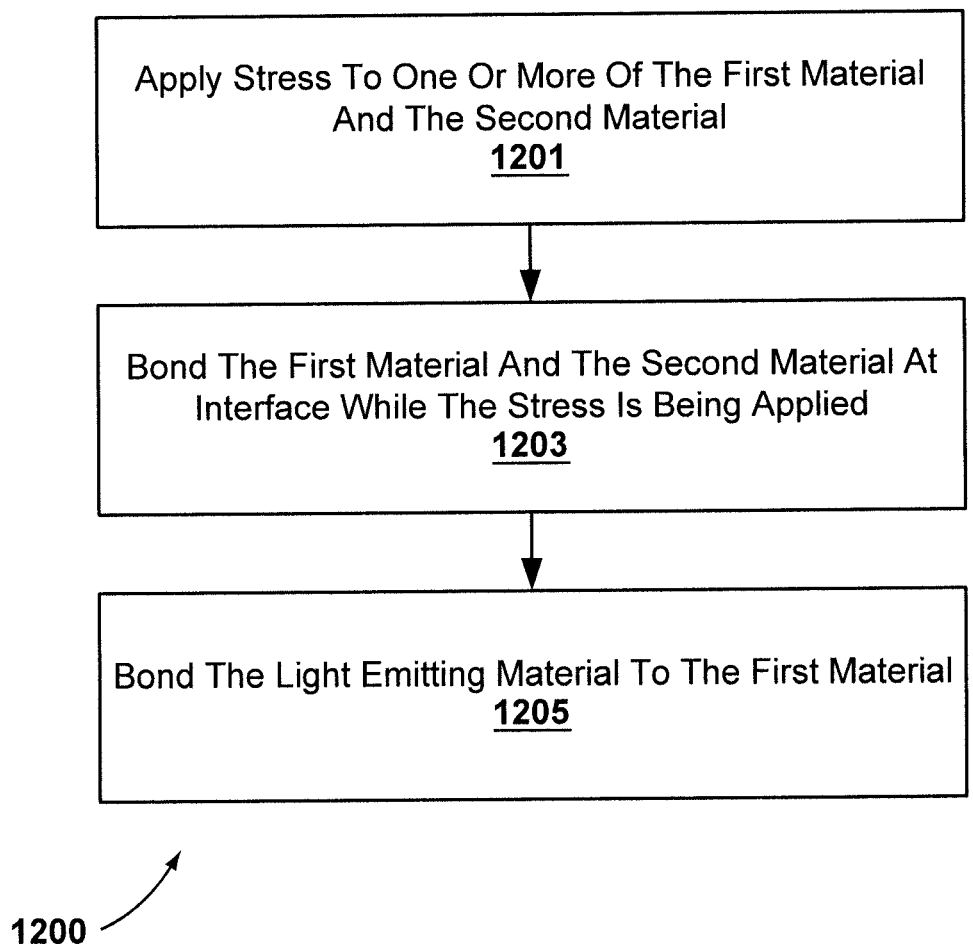
FIG. 12 depicts a flowchart of a method for assembling a light emitting device with a heat sink composed of two materials, according to non-limiting implementations.

Attention is now directed to FIG. 12 which depicts a method 1200 for enabling assembling a device comprising a heat sink composed of two materials. In order to assist in the explanation of method 1200, it will be assumed that method 1200 is performed to assemble device 100. Furthermore, the following discussion of method 1200 will lead to a further understanding of device 100 and its various components. However, it is to be understood that device 100 and/or method 1200 can be varied, and need not work exactly as discussed herein in conjunction with each other, and that such variations are within the scope of present implementations.

At block 1201, stress is applied to one or more of first material 105 and second material 107. At block 1203, first material 105 and second material 107 are bonded at interface 109 while the stress is being applied. At block 1205, light emitting material 101 is bonded to first material 105.

Applying stress at block 1201 can comprise one or more of: raising a temperature of one or more of first material 105 and second material 107; and applying mechanical stress to one or more of first material 105 and second material 107.

For example, a temperature of first material 105 can be raised to expand an aperture thereof so that second material 107 can be bonded to first material 105 at interface 109. Alternatively, as with device 100c, a temperature of second material 107c can be raised to expand an aperture thereof so that first material 105c can be bonded to second material 107c at interface 109c. Alternatively, mechanical stress can be used to stress one or more of first material 105 and second material 107 to fit first material 105 and second material 107 together and then bond first material 105 and second material 107 together at interface 109. In any event, in method 1200, the bonding at block 1201 occurs when the stress is being applied, hence, blocks 1201, and 1203 can occur in tandem.

Alternatively, a temperature of all of light emitting material 101, first material 105 and second material 107 can be raised during assembly such that blocks 1201, 1203 and 1205 occur in tandem.

Alternatively, a temperature of all of light emitting material 101, first material 105 and second material 107 can be raised to a respective operating temperature, for example in implementations where each light emitting material 101, first material 105 and second material 107 operate at different temperatures when excitation light impinges on light emitting material 101 to produce emitted light.

Figure 13:
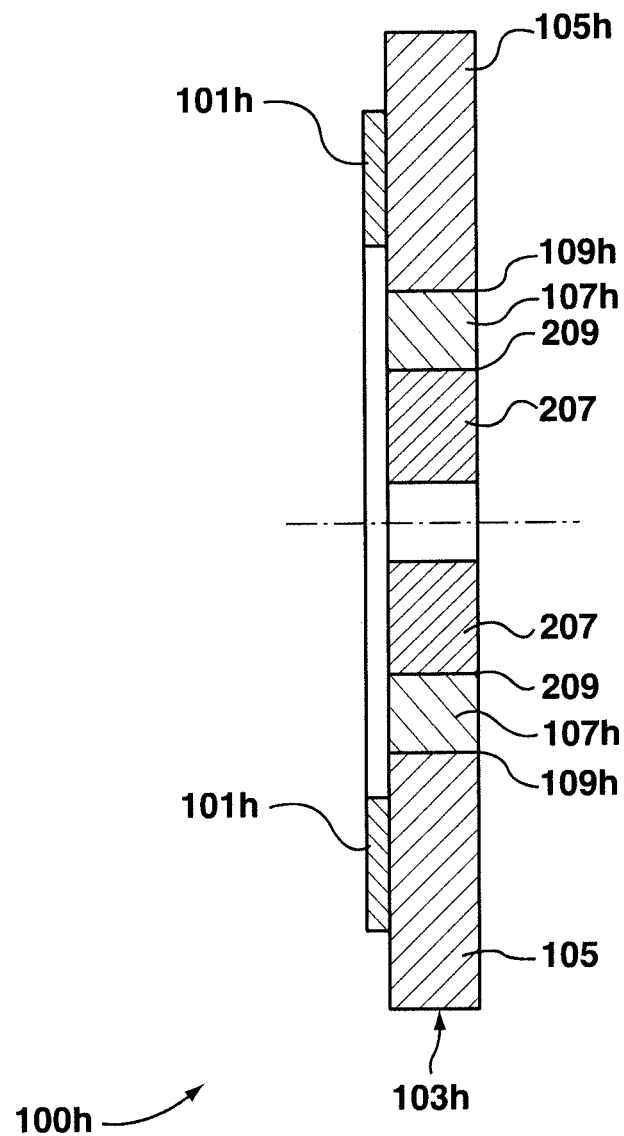
FIG. 13 depicts a cross-section of a light emitting device with a heat sink composed of three materials, according to non-limiting implementations.

Heretofore, implementations of heat sinks that comprise two materials have been described; however heat sinks that comprise three or more materials are also within the scope of the present specification. For example, attention is next directed to FIG. 13, which is substantially similar to FIG. 2, with like elements having like numbers, but with an "h" appended thereto. Hence, FIG. 13 depicts a device 100h comprising: a light emitting material 101h; and, a heat sink 103h comprising: a first material 105h configured to cool light emitting material 101h, first material 105h comprising a first CTE; a second material 107h bonded to first material 105h at an interface 109h there between, second material 107h comprising a second CTE lower than the first CTE, light emitting material 101h bonded to first material 105h but not second material 107h; and a third material 207 bonded to second material 107h at a respective interface 209 there between, such that second material 107h is sandwiched between first material 105h and third material 207, third material 207 comprising a third CTE lower than the second CTE. Light emitting material 101h is not bonded to third material 207. Interfaces 109h, 209 can each comprise a bond in tension and/or a bond in stress, respectively between first material 105h and second material 107h, and between second material 107h and third material 207; such tension and/or stress can be introduced when bonding occurs and/or such tension and/or stress can occur as device 100h heats up during operation.

In depicted implementations, an aperture of heat sink 103h is formed by third material 207. Further, third CTE of third material 207 is generally lower than second CTE of second material 107h, which is generally lower than the first CTE of first material 105h, so that the overall CTE of heat sink 103h becomes progressively smaller from first material 105h to third material 207. In other words, in these implementations, second material 107h acts as an intermediate between first material 105h and third material 207, to mitigate stress within heat sinks 103h.

In yet further implementations, heat sink 103h can comprise more than three materials, each comprising a respectively smaller CTE than a previous material, with first material 105h having the highest CTE and third material 207 having the lowest CTE, with materials there between providing a thermal expansion transition between the high CTE of first material 105h and the low CTE of third material 207.

Indeed, in some implementations, each interface 109h, 209 can be an abrupt interface, as depict, and in other implementations, a gradual interface. When a gradual interface (i.e. a mixture of each of two adjacent materials), it is appreciated that a gradual transition from a higher CTE to a lower CTE occurs over the gradual interface.

Furthermore, heat sinks of each of devices 100, 100a, 100b, 100c, 100d, 100e, 100f, 100g can be adapted to include three or more materials, similar to device 10011.

In general, a CTE of a second material, forming an interface with a first material bonded to a light emitting material, is chosen to reduce stress between light emitting material and first material. The boundary conditions associated with choosing such materials are next described with reference to FIGS. 14 to 17; such boundary conditions can be applied to any of devices 100, 100a, 100b, 100c, 100d, 100e, 100f, 100g.

Figure 14:
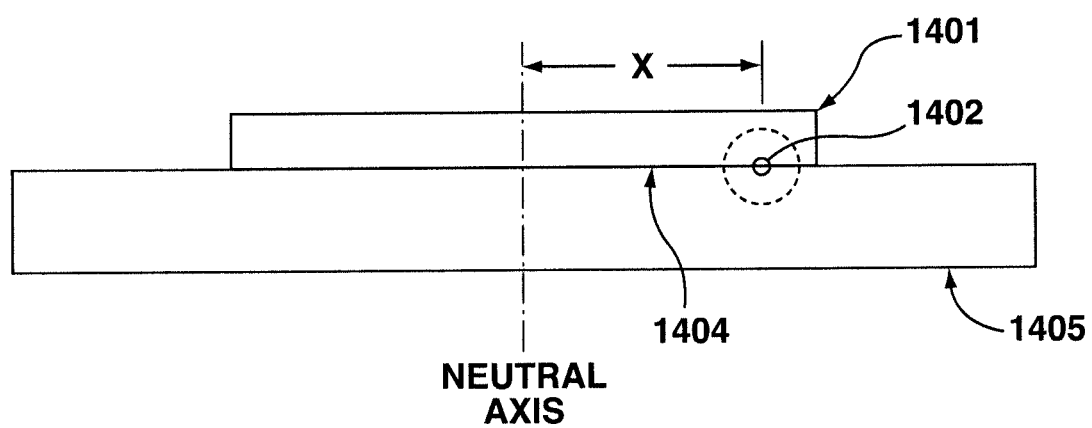
FIG. 14 depicts a light emitting material bonded to a first material, according to non-limiting implementations.
Figure 15:
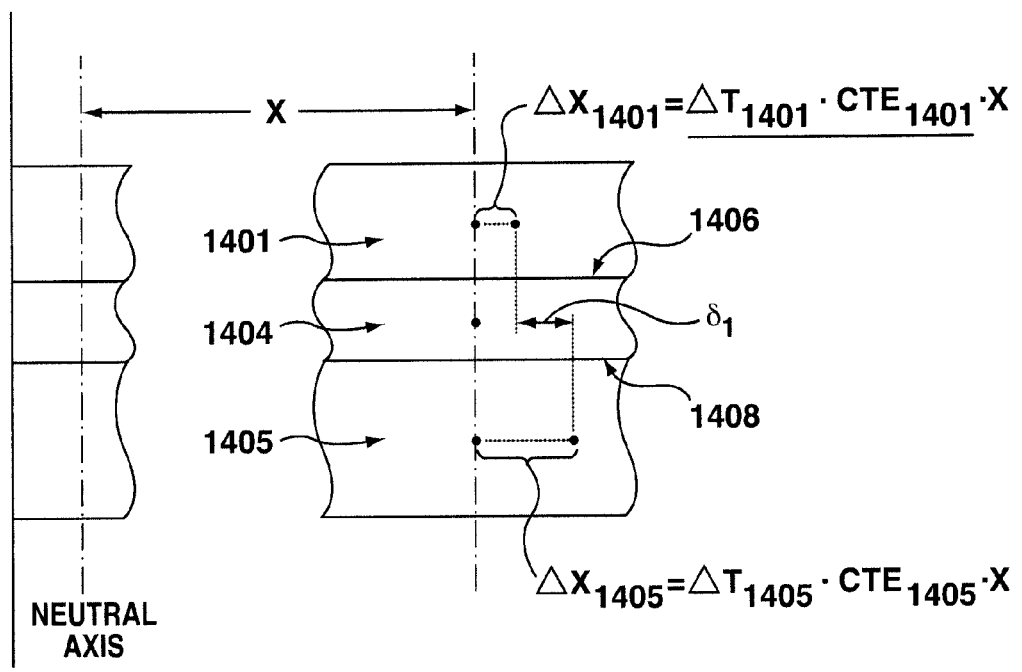
FIG. 15 depicts detail of FIG. 14, according to non-limiting implementations.

FIG. 14 depicts a light emitting material 1401, similar to light emitting material 101, bonded to a first material 1405, similar to first material 105, at an interface 1404. It is assumed in FIG. 14 that light emitting material 1401 is bonded to first material 1405 at interface 1404 using any suitable process and/or bonding material including, but not limited to, solder, adhesives, epoxies, glues and the like. It is further assumed in FIG. 14 that the depicted device expands in a direction "X" out from a neutral axis. FIG. 15 depicts details of FIG. 14 during such expansion, at an arbitrary position 1402 centered on interface 1404 and away from the neutral axis.

Hence, as a CTE of light emitting material 1401 is smaller than a CTE of first material 1405, expansion of light emitting material 1401 is smaller than expansion of first material 1405 when the temperature of each is increased. Expansion of light emitting material 1401 can be defined as:

$$\Delta X_{1401} = \Delta T_{1401} * CTE_{1401} * X \quad \text{Equation 2,}$$

where $\Delta X_{1401}$ is a change in size of light emitting material 1401 along the direction of X (i.e. about parallel to interface 1404), $\Delta T_{1401}$ is a change in temperature of light emitting material 1401, $CTE_{1401}$ is the coefficient of thermal expansion of light emitting material 1401, and X is a distance from the neutral axis to position 1402. Similarly, expansion of first material 1405 can be defined as:

$$\Delta X_{1405} = \Delta T_{1405} * CTE_{1405} * X \quad \text{Equation 3,}$$

where $\Delta X_{1405}$ is a change in size of first material 1405 along the direction of X (i.e. about parallel to interface 1404), $\Delta T_{1405}$ is a change in temperature of first material 1405, $CTE_{1405}$ is the coefficient of thermal expansion of first material 1405, and X is a distance from the neutral axis to position 1402. The change in temperature of each of first material 1405 and second material 1407 can be the same or different, depending on heat flow within the device.

As $CTE_{1405}$ is larger than $CTE_{1401}$, $\Delta X_{1405}$ is larger than $\Delta X_{1401}$. The difference, $\delta_1$, between them can be expressed as:

$$\delta_1 = \Delta X_{1405} - \Delta X_{1401} \quad \text{Equation 4.}$$

Further, the stress introduced by difference $\delta_1$ is, as depicted, shear stress that occurs at interface 1404, as each of light emitting material 1401 and first material 1405 are expanding at different rates on either side of interface 1404, and about parallel to interface 1404. In other words, a side 1406 of interface 1404, bonded to light emitting material 1401 expands about $\Delta X_{1401}$, and a side 1408 of interface 1404, bonded to first material 1405 expands about $\Delta X_{1405}$, with the body of interface 1404 absorbing and/or mitigating the stress caused by the difference $\delta_1$.

CTE's of each material are chosen so that $\delta_1$ is generally less than and/or about equal to an allowable elongation of the material of interface 1404 (i.e. solder, adhesive, glue, epoxy and the like), and the shear load at sides 1406, 1408 is less than and/or about equal to an allowable shear strength of the material of interface 1404. In other words, light emitting material 1401 and first material 1405, as well as a material of interface 1404, are chosen so that, under a given change in temperature, $\delta_1$ meets these conditions.

Figure 16:
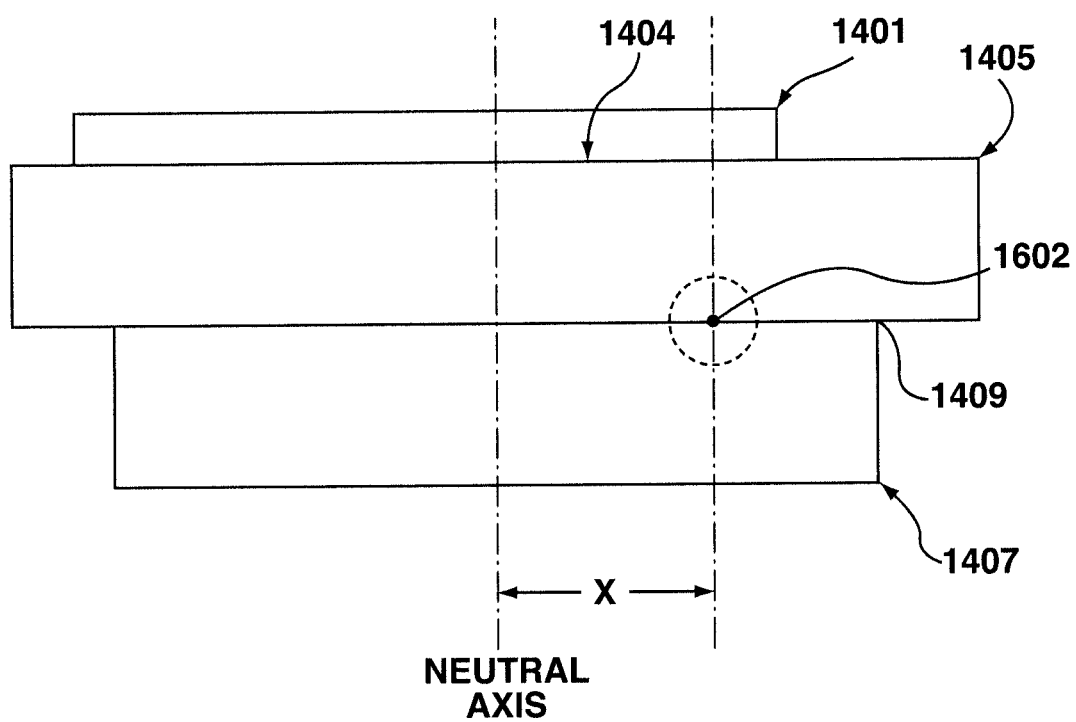
FIG. 16 depicts a second material bonded to the first material of FIG. 14, according to non-limiting implementations.
Figure 17:
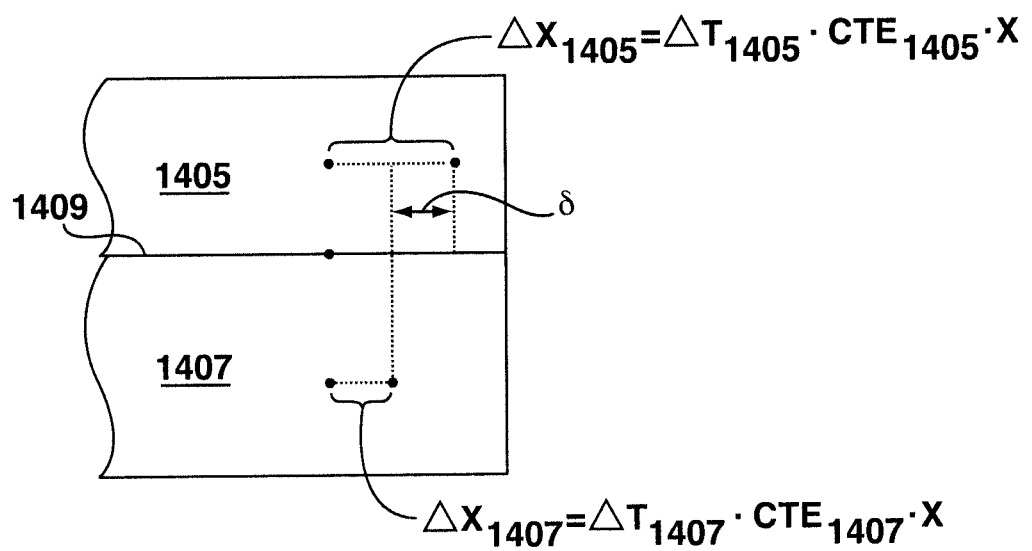
FIG. 17 depicts detail of FIG. 16, according to non-limiting implementations.

Attention is next directed to FIGS. 16 and 17, which are similar to FIGS. 14 and 15, respectively, with like elements having like numbers, however in FIGS. 16 and 17, a second material 1407, similar to second material 107, is bonded to first material 1405 on a side opposite light emitting material 1401. It is assumed in FIGS. 14 to 17 that each material is planar and about parallel to one another. Further, FIG. 16 depicts interface 1409 between first material 1405 and second material 1407, similar to interface 109b. It is further assumed in FIG. 16 that the depicted device expands in a direction "X" out from a neutral axis, as in FIG. 14. FIG. 17 depicts details of FIG. 16 during such expansion, at an arbitrary position 1602 centered on interface 1404 and away from the neutral axis along direction "X".

Hence, as a CTE of second material 1407 is smaller than a CTE of first material 1405, expansion of second material 1407 is smaller than expansion of first material 1405 when the temperature of each is increased. Expansion of second material 1407 can be defined as:

$$\Delta X_{1407} = \Delta T_{1407} * CTE_{1407} * X \quad \text{Equation 5,}$$

where $\Delta X_{1407}$ is a change in size of second material 1407 along the direction of X (i.e. about parallel to interface 1409), $\Delta T_{1407}$ is a change in temperature of second material 1407, $CTE_{1407}$ is the coefficient of thermal expansion of second material 1407, and X is a distance from the neutral axis to position 1602. Expansion of first material 1405 can be defined according to Equation 3. It is further assumed in each of FIGS. 14 to 17 that "X" is about the same, and that positions 1402, 1602 are at about the same distance from the neutral axis.

As $CTE_{1405}$ is larger than $CTE_{1407}$, $\Delta X_{1405}$ is larger than $\Delta X_{1407}$. The difference, $\delta_2$, between them can be expressed as:

$$\delta 2 = \Delta X_{1407} - \Delta X_{1405} \quad \text{Equation 6.}$$

Further, substituting Equations 4 and 5 into Equation 6:

$$\delta 2 = X * [\Delta T_{1407} * CTE_{1407} - \Delta T_{1405} * CTE_{1405}] \quad \text{Equation 7.}$$

Stress at interface 1409 can generally be defined as:

$$\epsilon = \delta 2 / X \quad \text{Equation 8,}$$

where $\epsilon$ is strain. Further, stress in each material can be defined as:

$$\sigma = E\epsilon \quad \text{Equation 9,}$$

where $\sigma$ is stress in each material, and E is Young's modulus for each respective material.

Substituting Equation into Equation 8, stress at interface 1409 can be defined in terms of temperature changes and CTE's of first material 1405 and second material 1407:

$$\epsilon = \Delta T_{1407} * CTE_{1407} - \Delta T_{1405} * CTE_{1405} \quad \text{Equation 10.}$$

Further, substituting Equation 10 into Equation 9, stress can be defined as:

$$\sigma = E * [\Delta T_{1407} * CTE_{1407} - \Delta T_{1405} * CTE_{1405}] \quad \text{Equation 11.}$$

Each material is hence chosen to be within the strength and/or stress limits of as defined by Equation 11. For example, stress in second material 1407 is:

$$\sigma_{1407} = E_{1407}\epsilon \quad \text{Equation 11,}$$

where $\sigma_{1407}$ is stress in second material 1407, and $E_{1407}$ is Young's Modulus of second material 1407, while c is defined by Equation 10.

Similarly, stress at interface 1409 is:

$$\sigma_{1409} = E_{1409}\epsilon \quad \text{Equation 12,}$$

where $\sigma_{1409}$ is stress in interface 1409, and $E_{1409}$ is Young's Modulus of a material of interface 1409, while $\epsilon$ is defined by Equation 10.

Similarly, stress in first material 1405 is:

$$\sigma_{1405} = E_{1405}\epsilon \quad \text{Equation 13,}$$

where $\sigma_{1405}$ is stress in first material 1405, and $E_{1405}$ is Young's Modulus of first material 1405, while $\epsilon$ is defined by Equation 10.

Further each of first material 1405, second material 1407, and a material of interface 1409 (e.g. solder, adhesive, and the like) is chosen so that $\sigma_{1405}$, $\sigma_{1407}$, $\sigma_{1409}$ are each simultaneously less than and/or about equal to a respective allowable stress in each of first material 1405, second material 1407, and a material of interface 1409. Allowable stress can be defined as a materials property, and can be less than and/or about equal to an amount of stress that can occur in a material before the material fails and/or less than a failure level of stress in a respective material.

These conditions can be expressed as follows:

$$\sigma_{1405} = E_{1405}\epsilon \leq \sigma_{allowable,1405} \quad \text{Equation 14;}$$

$$\sigma_{1407} = E_{1407}\epsilon \leq \sigma_{allowable,1407} \quad \text{Equation 15;}$$

$$\sigma_{1409} = E_{1409}\epsilon \leq \sigma_{allowable,1409} \quad \text{Equation 16;}$$

where $\sigma_{allowable,1405}$, $\sigma_{allowable,1407}$, $\sigma_{allowable,1409}$ is the respective allowable stress in each of first material 1405, second material 1407, and interface 1409.

Further, when each of these conditions are satisfied, then expansion of first material 1405 is limited and/or constrained by expansion of second material 1407; in addition, the expansion at interface 1404, as defined by Equation 4, can be approximated by:

$$\delta_1 = \Delta X_{1407} - \Delta X_{1401} \quad \text{Equation 17,}$$

assuming that $\Delta X_{1407}$ is similar to $\Delta X_{1405}$.

Hence, for the integrity of the bond at interface 1404 between light emitting material 1401 and first material 1405 to be maintained, $\delta_1$, as defined by Equation 17, is less than or equal to the allowable elongation and/or expansion of a material of interface 1404. Further, returning to FIG. 15 (and assuming that second material 1407 is bonded to first material 1405), the shear load at sides 1406, 1408 is less than the allowable shear strength of the material of interface 1404 (e.g. adhesive, solder and the like). Again, allowable shear strength, allowable elongation, allowable expansion and the like are appreciated to be materials properties that can be found in tables, manuals, etc., describing possible materials to be used in devices described herein. Further, the term "allowable" is not to be interpreted as a relative term, nor a term indicative of involving a thought process; rather, the term allowable when used herein with reference to a stress and the like, refers to a property of a material below which the integrity of the material is maintained and above which the integrity of the material can be compromised.

Figure 18:
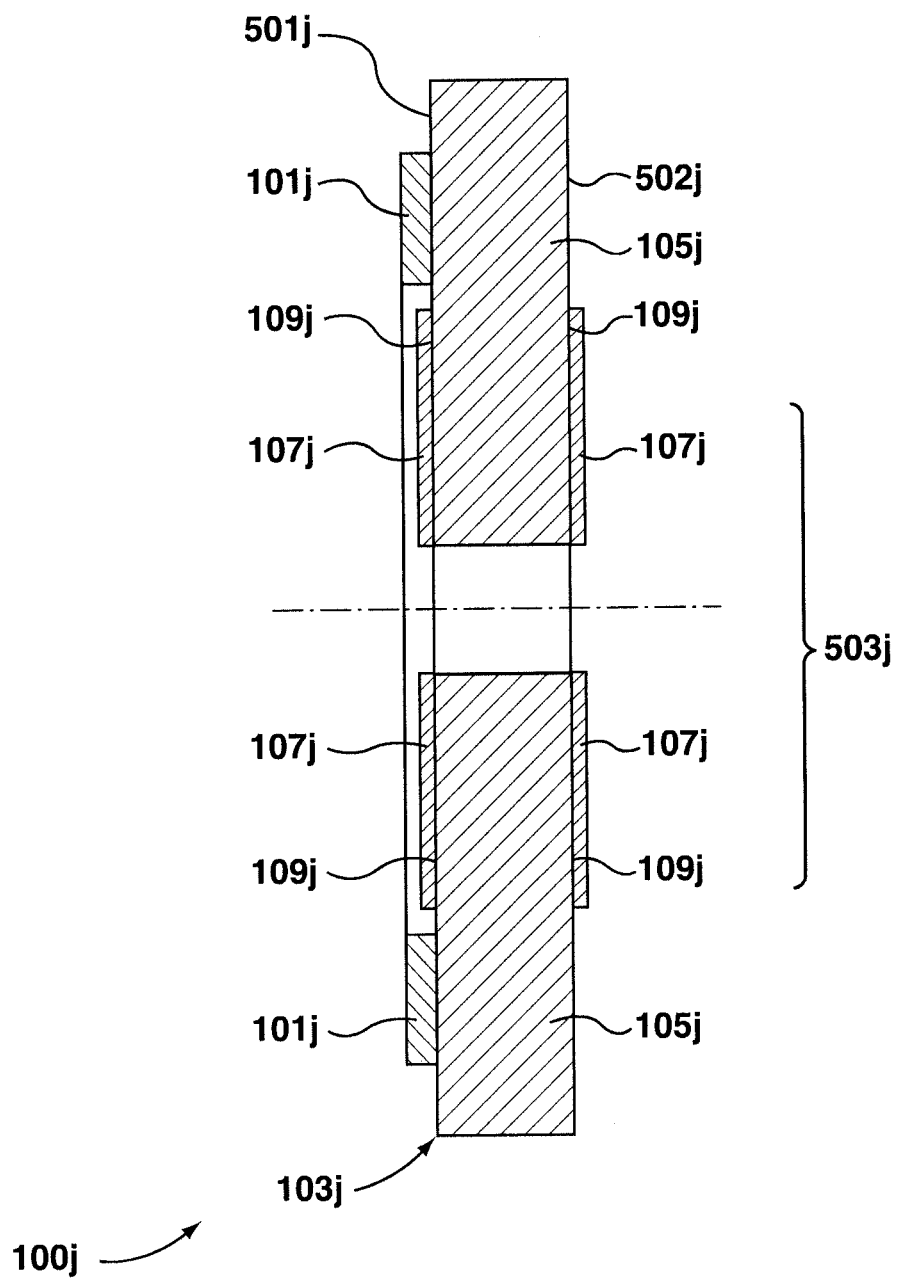
FIG. 18 depicts a cross-section of a light emitting device with a heat sink composed of two materials, according to non-limiting implementation.

Attention is next directed to FIG. 18 which depicts a device 100*j*, similar to device 100*b*, with like elements having like numbers with, however, a "j" appended thereto rather than a "b". Device 100*j* hence comprises: a light emitting material 101*j*; and, a heat sink 103*j* comprising: a first material 105*j* configured to cool light emitting material 101*j*, first material 105*j* comprising a first CTE; and, a second material 107*j* bonded to first material 105*j* at an interface 109*j* there between, second material 107*j* comprising a second CTE lower than the first CTE, light emitting material 101*j* bonded to first material 105*j* but not second material 107*j*. Like interface 109*b*, interface 109*j* can comprise a bond in stress between first material 105*j* and second material 107*j*, and specifically a bond in shear.

First material 105*j* comprises at least one planar surface, and specifically as depicted a first planar surface 501*j*, and a second planar surface 502*j*; and, second material 107*j* is bonded to one or more of planar surfaces 501*j*, 502*j*. Generally, first material 105*j* comprises a plate with light emitting material 101*j* bonded to first planar surface 501*j*. As depicted, second material 107*j* comprises two portions respectively bonded to each of first planar surface 501*j* and second planar surface 502*j*. Indeed, both of first material 105*j* and second material 107*j* comprise a common aperture, with second material 107*j* and the aperture forming a hub 503*j*.

In other words, as in device 100*b*, first material 105*j* is sandwiched between two portions of second material 107*j*, each portion of second material 107*j* bonded to first material 105*j* on opposing sides.

However, in device 100*j*, second material 107*j* comprises two thin films of material on opposite sides of first material 105*j*. For example, attachment of thin films of second material 107*j* to first material 105*j* can occur using lamination, adhesion, vacuum deposition, chemical deposition techniques and the like. Comparing device 100*j* with device 100*b*, it is apparent that while the general structures are similar, second material 107*j* is thinner than second material 107*b*. However, second material 107*j*, and dimensions thereof, are chosen so that a deposited thickness of second material 107*j* meets the criteria outlined above with respect to Equation 15; indeed, device 100*j* is generally designed so that the criteria of Equations 15 to 17 are met.

In other words, second material 107*j* can comprise a thin film of material (e.g. including, but not limited to, less than 10 µm) that meet the criteria of Equation 15; such thin films of material can include thin films of graphene, which has both a CTE lower than aluminum (e.g. first material 105*j*) and can withstand the stress of temperature changes that occur at device 100*j* when light emitting material 101*j* is excited by laser light.

From device 100*j* it is apparent that dimensions of each of the devices described herein can depend on the materials selected, and the properties thereof.

In any event, described herein is a light emitting device that includes a light emitting material and a heat sink composed of two materials of different CTEs that are bonded together. The heat sink includes a first material configured to cool the light emitting material, the light emitting material bonded thereto, and a second material also bonded to the first material, the second material having a lower CTE than the first material. The second material constrains thermal expansion of the first material and lowers the effective CTE of the heat sink. The lower effective CTE can be achieved as the interface between the two materials of the heat sink comprises one or more of: a bond in stress between the first material and the second material; a bond in tension between the first material and the second material; a bond in shear between the first material and the second material; and, a bond in compression between the first material and the second material.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
a light emitting material configured to emit light of at least a first wavelength when excited by excitation light of at least a second wavelength different from the first wavelength; and,
a heat sink comprising:
a first material configured to cool the light emitting material, the first material comprising a first coefficient of thermal expansion (CTE); and,
a second material bonded to the first material at an interface there between, the second material comprising a second CTE lower than the first CTE, the second material positioned to prevent expansion of the first material at the interface during heating, the second material having one or more surfaces not in contact with the first material, the interface comprising a bond in stress between the first material and the second material, the stress applied to the interface during bonding of the second material to the first material to increase an intersection temperature of respective thermal expansion curves of the light emitting material and the heat sink, such that, at an operating temperature, a thermal expansion deflection between the light emitting material and the heat sink is reduced,
the light emitting material bonded to the first material but not the second material, each of the light emitting material, heat sink, the first material, and the interface having circular symmetry, the interface being around respective complementary surfaces of each of the first material and the second material.

2. The device of claim 1, wherein the first material comprises an aperture, and the second material is located in the aperture, the interface there between located at an edge of the aperture.

3. The device of claim 2, wherein the first material surrounds the second material.

4. The device of claim 1, wherein the second material is bonded to the first material at an outer edge of the first material, the interface there between located at the outer edge.

5. The device of claim 4, wherein the second material surrounds the first material.

6. The device of claim 1, wherein the interface further comprises one or more of:
a bond in shear between the first material and the second material;
a bond in peel between the first material and the second material; and,
a bond in compression between the first material and the second material.

7. The device of claim 1, further comprising apparatus for bonding the first material to the second material, the apparatus comprising at least one of: fasteners; screws; dowels; rivets; epoxy; adhesive; a weld located at the interface; solder located at the interface; and brazing located at the interface.

8. The device of claim 1, wherein the first material comprises at least one planar surface, and the second material is bonded to the first material at the at least one planar surface.

9. The device of claim 1, wherein the first material is non-planar on a side opposite the light emitting material, and the second material is bonded to the side opposite the light emitting material.

10. The device of claim 1, wherein the heat sink is in a shape of a cooling plate.

11. The device of claim 1, wherein the heat sink is in a shape of a cooling drum.

12. The device of claim 1, wherein the first material comprises one or more of a first metal and aluminum, and the second material comprises one or more of a second metal, stainless steel, copper-tungsten, an alloy of iron-nickel-cobalt, ceramic, and glass.

13. The device of claim 1, further comprising a third material bonded to the second material at a respective interface there between, such that the second material is sandwiched between the first material and the third material, the third material comprising a third CTE lower than the second CTE.

* * * * *